Oct. 7, 1952      E. K. STODOLA      2,613,348
FREQUENCY MODULATION SYSTEM
Filed Oct. 6, 1944      2 SHEETS—SHEET 1
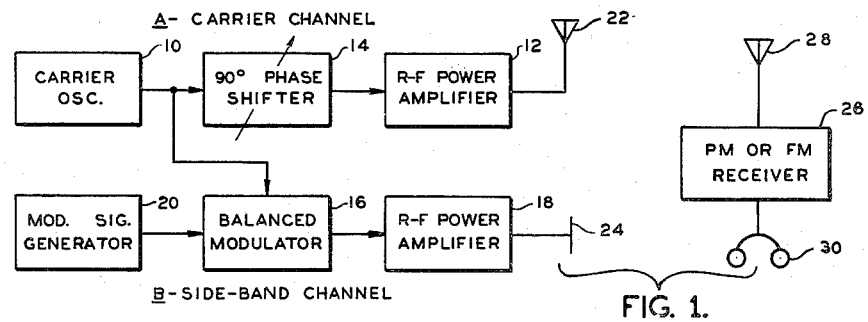
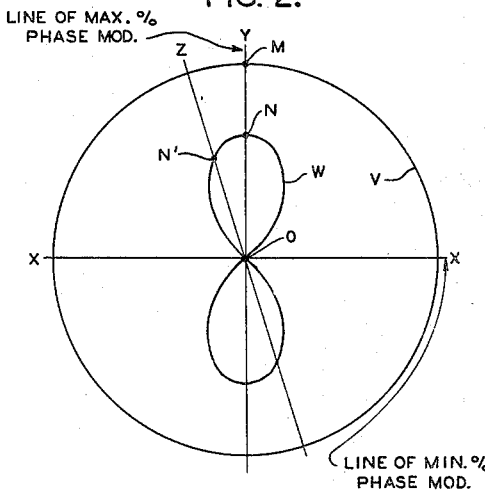
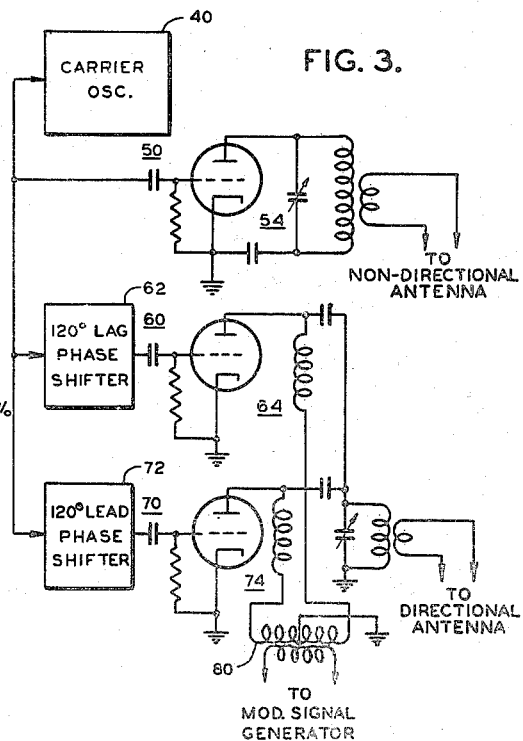
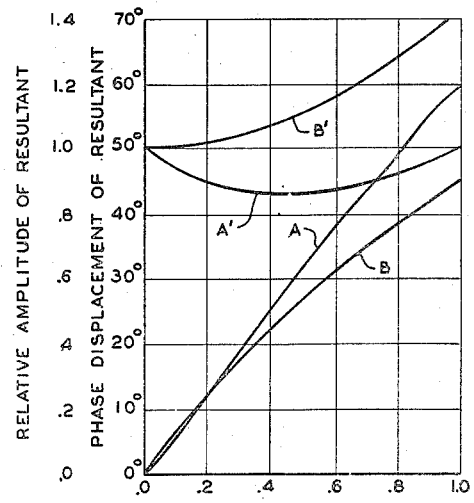
*INVENTOR.*
EDWIN K. STODOLA
BY *William D. Hall*
ATTORNEY Patented Oct. 7, 1952

2,613,348

UNITED STATES PATENT OFFICE 2,613,348

FREQUENCY MODULATION SYSTEM

Edwin K. Stodola, Neptune, N. J.

Application October 6, 1944, Serial No. 557,539

16 Claims. (Cl. 343—11)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to wave-length modulation, and more particularly to directional systems which utilize wave-length modulated waves.

It is a principal object of this invention to provide a directional system in which an indication of direction is obtained by means of a wave-length modulated wave having a degree of modulation which is a function of direction.

It is a further object of the invention to provide improved methods and means for obtaining wave-length modulated waves having a high degree of linearity over a relatively wide range of modulation.

Still another object of the invention is to provide an improved object detection system utilizing wave-length modulated waves.

In accordance with this invention, there are transmitted a plurality of like-frequency, phase-displaced waves, preferably having different directional characteristics. One of said waves is preferably of constant amplitude while another is amplitude modulated. Preferably one wave is omnidirectional while another is directional. At a given point in space said signals will combine to form a resultant signal which is wave-length modulated to a degree depending on the displacement of said point from the direction of maximum amplitude of the directional wave. Or, if said waves are reflected by a body at said point, the location of said body can be determined by a conventional phase or frequency modulation receiver in the path of the reflected waves.

For a better understanding of the invention, together with other and further objects thereof, reference is had to the following description taken in connection with the accompanying drawings, and its scope will be pointed out in the accompanying claims.

In the accompanying drawings:

Fig. 1 is a block diagram of one embodiment of the invention;

Fig. 2 shows the radiation pattern of waves generated by the system in Fig. 1;

Fig. 3 is a block diagram of another embodiment of the invention;

Fig. 4 is a graph illustrating the characteristics of the system in Fig. 3;

Figure 5:
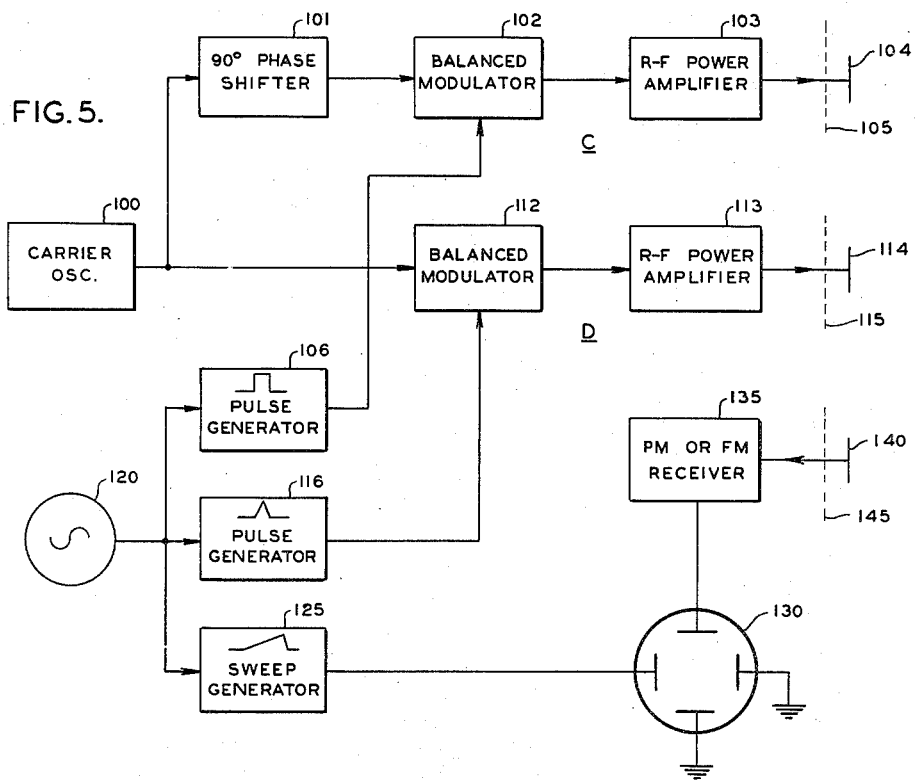
Fig. 5 is a block diagram of a pulse-echo object detection system incorporating the invention.

Referring particularly to Fig. 1, there is shown a directional system comprising a radio-frequency (R.-F.) carrier oscillator 10, preferably stabilized in frequency by means of a crystal. The output of said oscillator is fed to a pair of channels A and B having R.-F. power amplifiers 12 and 18, respectively. Channel B includes a balanced amplitude modulator 16, excited by both the carrier signal from oscillator 10 and the output of a modulation signal generator 20, which may generate a sinusoidal wave in the audio-frequency region. Balanced modulator 16 will normally suppress all or part of the carrier and generate side bands having an instantaneous amplitude which is proportional to the instantaneous amplitude of the modulating voltage.

The R.-F. potentials in the two channels are phase shifted 90° with respect to each other by means of an adjustable phase shifter 14 in the carrier channel A. The phase shifter may be inserted in the side-band channel, or a portion of the phase shift can be provided in both channels. The output of channel A is of constant amplitude and is radiated by an antenna 22 which may be omnidirectional, while the output of the side-band channel B is radiated by a directional antenna 24, which may be a dipole array or loop antenna or equivalents thereof, of any desired degree of directivity. Antenna 22 need only be relatively more broadly directional compared to 24, that is, the signal-to-noise ratio may be improved by imparting a degree of directivity to 22 if the needs of the system permit.

For reception of said signals, a conventional phase-modulation receiver 26, having an antenna 28 and output indicator 30, may be used. The antenna 28 may be omnidirectional, but a directional antenna may be used to increase the signal-to-noise ratio. The receiver may incorporate an amplitude limiter to eliminate undesirable amplitude modulation of the received signal.

Reference is now made to Fig. 2 for an explanation of the operation of the system above described. Assuming that transmission takes place from a point O, the circle V represents the omnidirectional radiation pattern from antenna 22, while the directional antenna 24 has a figure-of-eight pattern W. The omnidirectional wave is transmitted with constant amplitude, while the directionally transmitted output of the side-band channel varies from a minimum, which is zero when the carrier is entirely suppressed by the balanced modulator 16, to a maximum during each modulation cycle.

A phase-modulation receiver positioned along line Y—Y will receive both waves, the omnidirectional wave having a fixed amplitude, and the 90° phase-displaced directional signal being amplitude modulated. The ratio of said fixed-amplitude signal with respect to maximum amplitude of said side-band signal is proportional to OM/ON. These signals will vectorially combine in the receiver input circuit to yield a resultant phase-modulated signal which will be translated by the receiver.

A receiver positioned along line Z—Z will receive both signals, the ratio of the amplitude of the unmodulated signal with respect to the maximum amplitude of the modulated signal being proportional to OM/ON'. Since ON' is smaller than ON, the resultant signal at the receiver will have a lower degree of phase modulation.

A receiver along line X—X will receive a sideband signal having zero or minimum amplitude, and hence the degree of phase modulation will be minimum. Thus it will be seen that in any particular direction, the amplitude of the unmodulated wave is independent of direction, while the maximum amplitude of the modulated wave is dependent upon direction. Hence, the degree or percentage of modulation of the resultant phase-modulated wave at the receiver is dependent upon direction.

It should be noted that the maximum amplitude of the directional wave in the direction of maximum radiation should not exceed about 0.577 of the fixed amplitude wave, so that the extent of modulation does not exceed about 30° (tan 30°=0.577). Modulation in excess of 30° will not be linear, and will result in distortion of the wave shape in the output of the receiver and reduce the sharpness of direction determination. Suitable control means (not shown) for independently adjusting the relative amplitudes of both of the transmitted waves should, therefore, be incorporated in the two wave channels.

However, to obtain maximum noise reduction characteristics with systems of this type, it is desirable to obtain phase modulation greater than 30°. A system for producing such greater phase modulation is illustrated in Fig. 3, which shows three wave channels 50, 60 and 70 coupled to the carrier oscillator 40. Channel 50 includes an amplifier 54, while channels 60 and 70 include modulators 64 and 74, each of which may incorporate conventional means (not shown) for initially adjusting the output amplitudes of currents therein. Channels 60 and 70 include phase shifters 62 and 72 to cause currents therein to respectively lag and lead the current in channel 50 by an angle of about 120°. Because there is no fixed plate voltage applied to their tubes, the outputs of modulators 64 and 74 are normally zero. Modulators 64 and 74 are alternately made operative by applying the modulation signal to the plate circuits thereof in push-pull by means of a push-pull transformer 80, whereby they alternately modulate in amplitude the waves impressed upon their inputs. The output of amplifier 54 is radiated by a broadly directional or omnidirectional antenna, while the outputs of modulators 64 and 74 are coupled to a common output circuit and radiated by a directional antenna. It will be seen that the system in Fig. 3 provides means for omnidirectionally transmitting one wave of fixed amplitude, and transmitting one of two waves which are alternately amplitude-modulated and which are preferably 120° phase-displaced with respect to each other and with respect to the first wave. A receiver at a given point in space will combine said waves to produce a resultant wave which is modulated in phase to a degree dependent upon the displacement of the point of reception from the line of maximum transmission of the directional antenna. The advantage of this system resides in the fact that substantially linear phase-modulation can be obtained over a range which is greater than 30°.

For a comparison of the modulation characteristics of the system in Figs. 1 and 3, reference is made to Fig. 4, wherein curves A and A' show the phase and amplitude modulation characteristics respectively of the system in Fig. 3; while curves B and B' show the phase and amplitude modulation characteristics respectively of the system in Fig. 1. Curve A indicates that the phase modulation of the system in Fig. 3 is linear for as much as 60°, while curve A' indicates that the amplitude modulation of said system is considerably reduced, so that less amplitude limiting will be needed in the receiver.

The phase modulaiton method in Fig. 3 is not restricted to a directional system wherein the wave components are combined in the receiver. This method can be used for conventional signaling purposes by combining the waves in the three channels in a common output circuit at the transmitter to provide a resultant phase or frequency modulated wave which can then be multiplied to increase the degree of modulation and then amplified in the usual manner. The amplified resultant wave can then be radiated from an antenna.

The systems above described are capable of a variety of uses. If the directional wave is fixed in direction, the system is useful for producing a guide path for mobile craft. By providing at the receiver an indicator calibrated in terms of degree of modulation the invention can be used as a radio range or beacon.

The invention can also be used for pulse-echo object detection by means of a receiver located at the point of transmission and by rotation of the directional antenna until an echo of maximum degree of modulation is received. Pulse modulation can be applied to either channel, preferably the more directional channel, or to both channels. In the latter case the waves in the respective channels should preferably be differentially modulated in amplitude.

Fig. 5 illustrates an embodiment of such an object-detection system. As in Fig. 1, two wave transmitting channels C and D are provided, both being fed by a single frequency-stabilized carrier oscillator 100. The waves in said channel are 90° phase-displaced with respect to each other by a phase shifter 101. Channels C and D are respectively provided with balanced modulators 102 and 112, R.-F. power amplifiers 103 and 113, and directional antenna arrays 104 and 114, provided with reflector screens 105 and 115. Balanced modulators 102 and 112 will normally suppress the carrier impressed thereon so that normally there will be no energy radiated from either antenna.

The waves in channels C and D are periodically modulated by pulses derived from pulse generators 106 and 116 applied to modulators 102 and 112 respectively. The pulse generators are locked in synchronism by a syncronizing oscillator 120 operating at a relatively low frequency generally in the audio region. For each cycle or plurality of cycles of voltage from oscillator 120, generators 106 and 116 will produce, in a manner well known in the art, a single sharp pulse, the duration of which is considerably shorter than the intervals between pulses.

Oscillator 120 also controls a sawtooth sweep generator 125 which generates one sawtooth wave for each pulse generated by pulse generators 106 and 116. The sawtooth waves are applied to the horizontal plates of a cathode ray oscilloscope 130 to provide a time base.

The output of a conventional PM or FM receiver, fed by a directional receiving antenna including a dipole array 140 and reflector screen 145, is applied to the vertical plates of oscilloscope tube 130.

Figure 6:
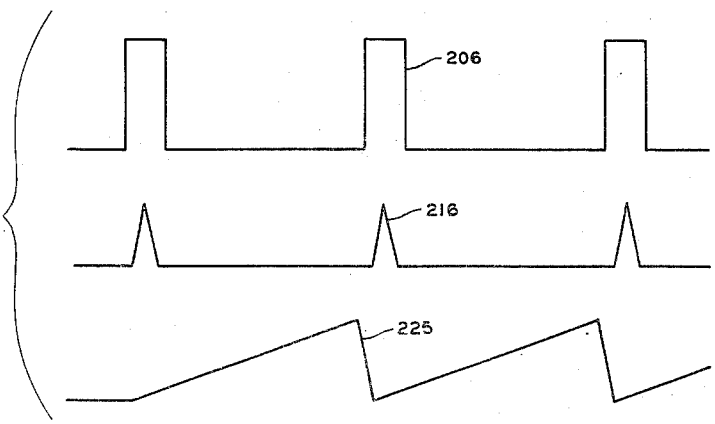
Fig. 6 shows wave forms produced by certain components in Fig. 5.

The operation of the system in Fig. 5 will now be described with reference to Fig. 6. As above pointed out, there are normally no waves transmitted by channels C and D. Pulse generators 106 and 116 will synchronously generate pulses of the form shown at 206 and 216 respectively, in Fig. 6. Pulses 216 are preferably triangular, while pulses 206 are rectangular and preferably wider than pulses 160. Said pulses are so synchronized that pulses 206 completely overlap pulses 216. At the same time sweep generator 125 generates sawtooth waves 225 in synchronous relation with pulses 216. The minimum intervals between pulses 216 depend upon the maximum distances to be measured, while the maximum duration of sawtooth waves 225 is preferably not greater than said intervals.

Pulses from generators 106 and 116 are applied to balanced modulators 102 and 112, respectively, to modulate waves in channels C and D to produce substantially coincident wave-trains having envelopes similar to those shown at 206 and 216, said wave-trains being separately radiated by antennas 104 and 114. On striking a reflecting object, both wave trains will be picked up by antenna 140 of the receiver and vectorially combined in the antenna circuit of receiver 135 to produce a resultant wave-train. Since the wave-train component radiated from channel C is substantially constant in amplitude for the pulse duration, while wave-train component radiated from channel D is continuously varied in amplitude for the duration of the pulse, and since said wave-train components are 90° phase-displaced with respect to each other, the resultant wave-train at the receiver input is modulated in phase and translated by the phase modulation detector provided in the receiver to produce a vertical deflection of the oscilloscope trace. Thus a series of discrete phase-modulated wave-trains are produced by generating and separately transmitting two discrete wave-trains which are differentially modulated in amplitude, phase-displacing the component waves of said two trains, preferably 90° with respect to each other, and then vectorially combining them in a receiver to produce a resultant wave-train which is modulated in phase.

As in the previously described systems, antenna 114 should be directional, the directivity being as sharp as is desired or as conditions may require, while antennas 104 and 140 may be non-directional or directional, but to a lesser degree than that of antenna 114. All directional antennas should be mounted for rotation in unison. Although a separate antenna is used for reception, antenna 104 can be used for this purpose by providing the usual duplexing means.

Instead of separately transmitting the two wave components from channels C and D, they may first be combined and then transmitted from a common antenna.

Modulators 102 and 112 need not be of the balanced type. They may be amplifiers which are normally biased to cutoff and intermittently rendered conducting by the pulses from generators 106 and 116. Or power amplifiers 103 and 113 may be so operated.

Although the above description deals with phase modulated waves, it is well known that phase modulation of a wave is always accompanied by a frequency modulation. Where only one modulating frequency is involved, the two types of modulation are identical. Hence the term wave-length modulation, as used herein, is meant to be generic to both types of modulation.

While there have been described what are at present considered preferred embodiments of the invention, it will be obvious to those skilled in the art that various changes and modifications may be made therein without departing from the invention, and it is aimed in the appended claims to cover all such changes and modifications as fall within the true spirit and scope of the invention.

I claim:

1. A wave-length modulation system comprising a source of carrier waves, three channels fed by said source, means for phase-displacing the waves in said channels approximately 120° with respect to each other, means for maintaining the wave amplitude in one channel substantially constant, a modulator in each of the other two channels, and means adapted to be coupled to a source of signal energy for alternately energizing said modulators, and means for combining the outputs of said three channels to derive a resultant wave-length modulated wave.

2. A wave-length modulation system comprising a source of carrier waves, three channels fed by said source, means for phase-displacing the waves in said channels approximately 120° with respect to each other, means for maintaining the wave amplitude in one channel substantially constant, a normally non-conducting modulator in each of the other two channels, said modulators having a common output circuit, means adapted to be coupled to a source of signal energy for controlling said modulators in push-pull, and means for combining the outputs of said three channels to derive a resultant wave-length modulated wave.

3. A directional radio system comprising a source of carrier waves, three channels fed by said source, means for phase-displacing the waves in said channels approximately 120° with respect to each other, means for maintaining the wave amplitude in one channel substantially constant, an antenna for radiating said constant amplitude wave, a normally non-conducting modulator in each of the other two channels, said modulators having their output circuits coupled to a second antenna, and means adapted to be coupled to a source of signal energy for rendering said modulators alternately conducting, one of said antennas being more directional than the other.

4. A directional radio system comprising a source of carrier waves, three channels fed in parallel by said source, means for phase-displacing the waves in said channels approximately 120° with respect to each other, means for maintaining the wave amplitude in one channel substantially constant, a first antenna for radiating said constant amplitude wave, a normally non-conducting modulator in each of the other two channels, said modulators having their output circuits coupled in parallel to a second antenna, and means adapted to be coupled to a source of signal energy for controlling said modulators in push-pull to render them alternately conducting, said first antenna being relatively non-directional and said second antenna being directional.

5. A system as set forth in claim 4, including a wave-length modulation receiver having a relatively non-directional antenna connected thereto, and means in the output of said receiver to indicate the degree of wave-length modulation of the received signal.

6. A pulse signaling system comprising a source of constant frequency carrier waves, a pair of channels fed in parallel by said source, a normally blocked modulator in each channel, separate wave radiators coupled to the outputs of said modulators, one of said radiators being more directive than the other, means for phase displacing the radiated waves less than 180° with respect to each other, means for synchronously generating two substantially concurrent groups of discrete signal pulses, the pulses of one group having a differently rising wave-form than the pulses of the other group, means for controlling the output of one of said modulators with one group of pulses and the output of the other modulator with the other group of pulses, a receiver for receiving and combining both groups of received pulses to produce resultant wavelength modulated pulses, said receiver including means for detecting only the wavelength modulation of said resultant pulses, and a visual indicator controlled by the output of said detecting means.

7. A pulse-echo object-detection system comprising a source of constant frequency carrier waves, a pair of channels fed in parallel by said source, a carrier-suppressing balanced modulator in each channel, separate antennas coupled to the outputs of said modulators, one of said antennas being more directive than the other, means for phase displacing the wave radiated by one antenna substantially 90° with respect to the wave radiated by the other antenna, means for synchronously generating two substantially concurrent groups of discrete signal pulses one of which is rectangular and the other triangular, means for controlling one of said modulators with one group of pulses and the other modulator with the other group of pulses, a receiver for receiving and vectorially combining both groups of received pulses to produce wavelength modulated resultant pulses, said receiver including a detector responsive only to the wavelength modulation of said resultant pulses, a cathode ray indicator having beam controlling means controlled by the output of said detector, and means for providing a time base for said cathode ray tube including means for generating sawtooth waves in synchronism with said pulses.

8. A communication system comprising means for generating carrier wave oscillations, means for omnidirectionally radiating said oscillations with a constant amplitude to produce a first electromagnetic wave field, means for deriving from said oscillations suppressed-carrier amplitude-modulated oscillations, means located at substantially the same point in space as said first-named radiating means for radiating said last-named oscillations to produce a second electromagnetic wave field, means for phase displacing said first and second electromagnetic wave fields substantially 90° at substantially every point in space, means for receiving and combining said electromagnetic waves to derive a resultant wavelength-modulated signal, and means for detecting only the wavelength modulation of said signal.

9. A system for radiating a direction dependent wave pattern comprising a source of wave energy, a pair of radiating channels coupled to said source for separately radiating said wave energy from substantially the same point in said medium with different degrees of directivity, means in at least one of said channels for amplitude modulating the energy therein, and means in at least one of said channels for producing a substantially constant phase displacement of less than 180° between the radiated wave fields at all points in said medium about said point, whereby when the radiated waves are received and combined at any point in said medium they produce a resultant wavelength modulated signal having a degree of modulation which is dependent upon direction.

10. A system for radiating a direction dependent wave pattern comprising a source of wave energy, a pair of radiating channels coupled to said source for separately radiating said wave energy from substantially the same point in said medium with different degrees of directivity, means in both of said channels for suppressed-carrier modulating the energy therein, and means in at least one of said channels for producing a substantially 90° phase displacement between the radiated wave fields at all points in said medium about said point, whereby when the radiated waves are received and combined at any point in said medium they produce a resultant wavelength modulated signal having a degree of modulation which is dependent upon direction.

11. A system for radiating a direction dependent wave pattern comprising a source of wave energy, a pair of radiating channels coupled to said source for separately radiating said wave energy from substantially the same point in said medium with different degrees of directivity, means in one of said channels for suppressed-carrier modulating the energy therein, the ratio of the amplitude of the modulated radiated wave to the amplitude of the other radiated wave being not greater than 0.577, and means in at least one of said channels for producing a substantially 90° phase displacement between the radiated wave fields at all points in said medium about said point, whereby when the radiated waves are received and combined at any point in said medium they produce a resultant wavelength modulated signal having a degree of modulation which is dependent upon direction.

12. A directional signaling system comprising a source of wave energy, a pair of radiating channels coupled to said source for separately radiating said wave energy from substantially the same point in said medium with different degrees of directivity, means in at least one of said channels for amplitude modulating the energy therein, means in at least one of said channels for producing a substantially constant phase displacement of less than 180° between the radiated wave fields at all points in said medium about said point, and a receiver for receiving and combining the radiated waves to produce a resultant wavelength modulated signal having a degree of modulation which is dependent upon direction, said receiver including means for detecting only the wavelength modulation component of said signal.

13. A system for radiating a direction dependent wave pattern in a medium, comprising a source of continuous waves, a first radiating channel coupled to said source for non-directionally radiating said waves from a given point in said medium, a second radiating channel coupled to said source for radiating said waves with a figure-of-eight directional pattern from substantially the same point, means for amplitude modulating the waves in at least one of said channels, and means in at least one of said channels for producing phase displacement of substantially 90° between the radiated wave fields at all points in said medium about said point, whereby when said waves are received and combined at any point in said medium they produce a resultant phase modulated signal having a degree of phase modulation which is dependent upon direction.

14. A system for radiating a direction dependent wave pattern in a medium, comprising a source of continuous waves, a first radiating channel for non-directionally radiating said waves from a given point in said medium with constant amplitude, a second radiating channel for radiating said waves with a figure-of-eight directional pattern from substantially the same point, means in said second channel for suppressed-carrier modulating the waves therein, and means in at least one of said channels for producing a phase displacement of substantially 90° between the radiated wave fields at all points in said medium about said point, whereby when said waves are received and combined at any point in said medium they produce a resultant phase modulated signal having a degree of phase modulation which is dependent upon direction.

15. A system for radiating a direction dependent wave pattern in a medium, comprising a source of continuous waves, a first radiating channel for non-directionally radiating one of said waves from a given point in said medium, a second radiating channel for radiating the other of said waves with a figure-of-eight directional pattern from substantially the same point, means in both of said channels for amplitude modulating the waves therein, and means in at least one of said channels for producing a substantially constant phase displacement of substantially 90° between the radiated wave fields at all points in said medium about said point, whereby when said waves are received and combined at any point in said medium they produce a resultant phase modulated signal having a degree of phase modulation which is dependent upon direction.

16. A system for radiating a directionally characterized signal comprising means for generating separated carrier wave and side-band components representative of a modulated carrier wave, a pair of radiating means for respectively radiating said components separately from effectively the same point in space, one of said radiating means being more directive than the other, and means for producing a substantially constant phase displacement of substantially 90° between the radiated wave fields produced by said components at all points in space about said point, whereby when said fields are received and combined at any point in space they produce a resultant space modulated signal having a degree of phase modulation which is dependent upon direction.

EDWIN K. STODOLA.

REFERENCES CITED

The following references are of record in the file of this patent:

UNITED STATES PATENTS

| Number | Name | Date |
|---|---|---|
| 1,913,918 | Diamond | June 13, 1933 |
| 2,045,072 | Espenschied | June 23, 1936 |
| 2,222,587 | Sanders | Nov. 19, 1940 |
| 2,252,699 | Byrne | Aug. 19, 1941 |
| 2,261,272 | Newhouse | Nov. 4, 1941 |
| 2,313,048 | Byrne | Mar. 9, 1943 |
| 2,367,372 | Purington | Jan. 16, 1945 |
| 2,407,644 | Benioff | Sept. 17, 1946 |
| 2,423,644 | Evans | July 8, 1947 |
| 2,433,804 | Wolff | Dec. 30, 1947 |
| 2,434,934 | Kitzerow | Jan. 27, 1948 |
| 2,444,452 | Labin | July 6, 1948 |
| 2,480,123 | Deloraine | Aug. 30, 1949 |
| 2,495,737 | Labin | Jan. 31, 1950 |